United States Patent Office.

PHILIP SCHIDROWITZ AND OTTO ROSENHEIM, OF LONDON, ENGLAND, ASSIGNORS TO THE JOSEPH TURNER & COMPANY, LIMITED, OF QUEENSBERRY, ENGLAND.

PIPERIDYL CARBAMATE OF PIPERIDIN AND PROCESS OF MAKING SAME.

SPECIFICATION forming part of Letters Patent No. 614,991, dated November 29, 1898.

Application filed December 21, 1897. Serial No. 662,929. (Specimens.)

*To all whom it may concern:*

Be it known that we, PHILIP SCHIDROWITZ and OTTO ROSENHEIM, of 57 Chancery Lane, London, England, have invented a certain new and useful Improvement in the Manufacture of a New Product from Piperidin, of which the following is a specification.

This invention relates to the manufacture of a new product from piperidin. This new product is obtained by the action of carbonic acid, the result being a new salt or body which possesses valuable pharmacological and therapeutic properties.

In carrying out our invention the piperidin when acted upon by the carbonic acid may be employed either alone or dissolved in a suitable solvent—such, for example, as acetone, ether, or petroleum-spirit—and the carbonic acid may be either moist or dry. In either case a product is formed with evolution of heat, which is a white crystalline body in needles or plates having a melting-point of 79° to 80° centigrade. This body distils without decomposition and is easily soluble in water. It decomposes by the action of weak acids with evolution of carbonic acid. It is readily soluble in cold or hot alcohol, methyl and amyl alcohols, and chloroform, and less soluble in cold ether, petroleum-spirit, and acetone. This body is piperidyl carbamate of piperidin, and it corresponds to the formula

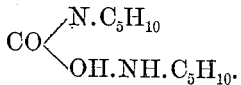

It can be made in several ways. According to one way, which we will give as an example, ten kilograms of piperidin are dissolved in five kilograms of acetone in a suitable vessel, preferably provided with cooling apparatus, and the solution is saturated with carbonic acid, the saturation being preferably effected by passing the carbonic acid into the solution. The salt crystallizes out and is filtered off by any ordinary method and is recrystallized, if necessary. According to another way the piperidin is spread or distributed in shallow vessels or on trays in an air-tight chamber and exposed to the action of carbonic-acid gas, which is introduced to the chamber, preferably, at the upper part. The chamber may be provided with a safety-valve and pressure-gage and with a door or doors for the introduction and removal of the trays.

What we claim, and desire to secure by Letters Patent, is—

1. As a new product, piperidyl carbamate of piperidin, being a compound formed by the action of carbonic acid upon piperidin, such compound being a white crystalline body, soluble in water, alcohol, methyl and amyl alcohols and chloroform, melting at 79° to 80° centigrade, and having the formula

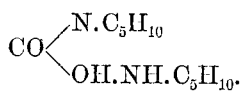

2. The method of producing piperidyl carbamate of piperidin which consists in treating piperidin with carbonic acid, substantially as hereinbefore described.

3. The method of producing piperidyl carbamate of piperidin which consists in dissolving piperidin in a solvent and then treating it with carbonic acid, substantially as hereinbefore described.

4. The method of producing piperidyl carbamate of piperidin which consists in dissolving piperidin in acetone and then treating it with carbonic acid, substantially as hereinbefore described.

In witness whereof we have hereunto signed our names in the presence of two subscribing witnesses.

PHILIP SCHIDROWITZ.
OTTO ROSENHEIM.

Witnesses:
GEORGE C. BACON,
ROBERT M. SPEARPOINT.